United States Patent [19]

Dukeshire et al.

[11] Patent Number: 5,374,079
[45] Date of Patent: Dec. 20, 1994

[54] CLOSURE FOR AIR BAG ASSEMBLY

[75] Inventors: Mark Dukeshire, Northwood; Joseph E. McKeever, Center Barnstead; John C. Galloway, Durham; Everett A. Hastings, Farmington, all of N.H.

[73] Assignee: Davidson Textron Inc., Dover, N.H.

[21] Appl. No.: 151,969

[22] Filed: Nov. 15, 1993

[51] Int. Cl.⁵ ............................................. B60R 21/16
[52] U.S. Cl. ................................. 280/728 B; 280/732
[58] Field of Search .................... 280/728 B, 731, 732

[56] References Cited

U.S. PATENT DOCUMENTS

| | | | |
|---|---|---|---|
| 4,893,833 | 1/1990 | DiSalvo et al. | 280/732 |
| 5,066,037 | 11/1991 | Castrigno et al. | 280/728 B |
| 5,096,221 | 3/1992 | Combs et al. | 280/728 B |
| 5,161,819 | 11/1992 | Rhodes, Jr. | 280/728 B |
| 5,183,288 | 2/1993 | Inada et al. | 280/728 B |

FOREIGN PATENT DOCUMENTS 303052 10/1992 Japan ............................ 280/728 B Primary Examiner—Kenneth R. Rice
Attorney, Agent, or Firm—Reising, Ethington, Barnard, Perry & Milton

[57] ABSTRACT

A closure for an air bag assembly includes a door having an edge portion of the door that defines a segment of a deployment opening for the air bag when the door is opened and the door is held in a normally closed position by a fastener tab that includes a lip thereon that will cover the edge portion of the door to prevent the air bag from engaging the edge portion during deployment.

2 Claims, 3 Drawing Sheets 5,374,079

CLOSURE FOR AIR BAG ASSEMBLY

BACKGROUND OF THE INVENTION

1. Field of the Invention

This invention relates to closures for air bag assemblies and more particularly to such closures having a hinged connection at one edge and a fastener tab at an opposite edge which allows pivoting of the closure during deployment of the air bag.

2. Description of the Related Art

Closures for air bag assemblies are known in which an edge portion of the closure is held in a closed position by a fastener that will separate during air bag deployment to enable the closure to be displaced by the air bag to form an air bag deployment opening. One example of such air bag assembly can be seen in U.S. Pat. No. 4,893,833, wherein the rear edge of the closure is engaged by the air bag as it is inflated for passage through the deployment opening.

SUMMARY OF THE INVENTION

An object of the present invention is to provide a closure for an air bag assembly that will be held in a closed position during normal use and that will separate during air bag deployment wherein the fastener tab for the closure includes an integral lip portion thereon that will shield the closure from the air bag as it is deployed.

Another object of the present invention is to provide a closure for an air bag assembly that includes an outer skin laminated to a core member and wherein the closure is held in a closed position by a fastener tab having an integral lip portion that is operative to shield the closure from the air bag during its deployment.

A feature of the present invention is to provide such closures wherein the fastener tab includes a separable fastener plate having an edge portion thereon adapted to be fastened to the door at the perimeter of the door and wherein the fastener plate has a lip portion extending from the connected edge portion and operative to cover the intersection between an outer skin layer and a core during deployment; the lip portion having a surface inclined to prevent delamination of the skin from the core during air bag deployment.

A further feature of the present invention is to provide a closure as set forth in the preceding paragraph wherein the fastener tab includes a plurality of spaced slots formed in the fastener plate adjacent the edge portion thereof; the lip portion being formed between the spaced slots and a mounting member when the air bag is deployed.

A further feature of the present invention is to provide a closure as set-forth in the preceding paragraph wherein the door has an inner surface with a connection plate embedded therein inwardly of an intersection between the skin and the core member; the fastener plate having a first edge portion overlying the inner surface and connected to the connection plate; the fastener plate having a second edge portion arranged generally perpendicular to the first edge portion and adapted to be connected to a mounting member.

DETAILED DESCRIPTION OF THE INVENTION

Figure 1:
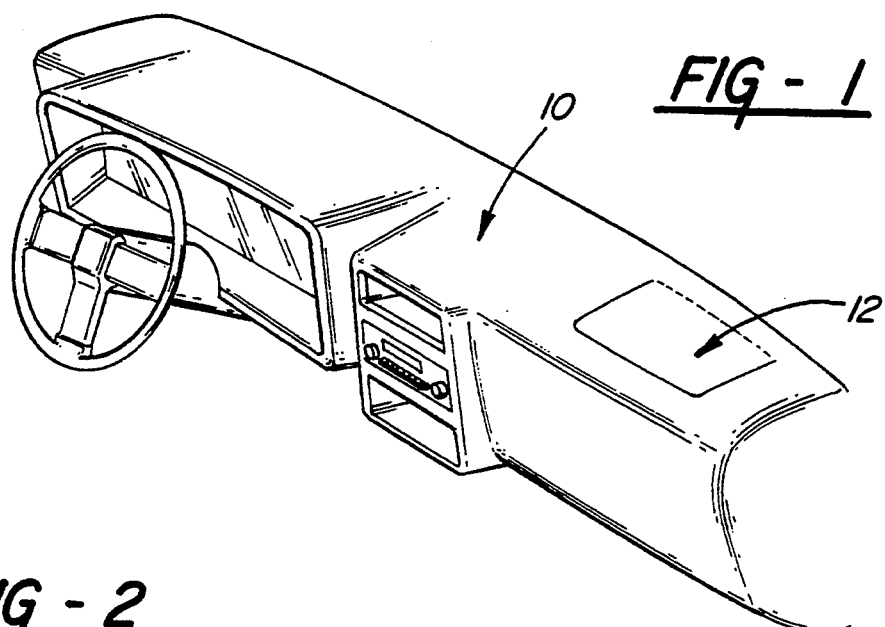
FIG. 1 is a view of a instrument panel including the closure of the present invention.
Figure 2:
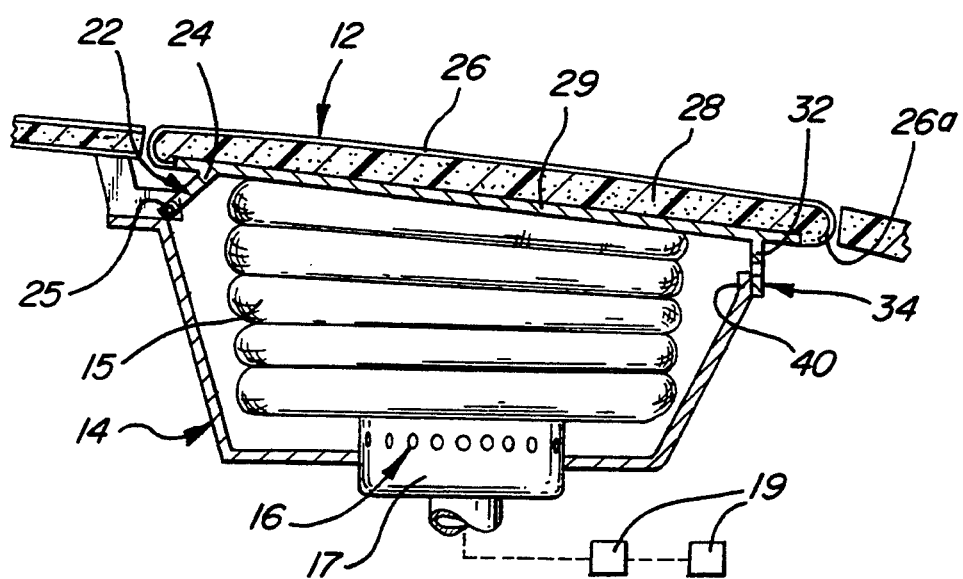
FIG. 2 is a sectional view of an air bag assembly taken along the line 2—2 of FIG. 1.

Referring to FIG. 1, an instrument panel 10 is illustrated including a composite plastic door closure 12 for an air bag assembly 14 having an inflatable air bag 15 that is adapted to be connected to an inflatant source 16 when the vehicle encounters an impact requiring occupant protection. In such case, the inflatant source directs an inflatant into the air bag 15 causing it to expand against the inner surface 18 of the door closure 12. In the illustrated arrangement, the inflatant is supplied from a gas generator 17 under the control of an inertial switch and controller 19. It should be understood that the present invention is equally suited for use with an inflatant system in which pressurized gas ($N_2$, Argon, Air) is released from a pressure vessel on vehicle impact. When the air bag 15 expands, it impacts the door closure 12 causing it to be opened thereby forming a deployment opening 20 through the instrument panel 10 through which the air bag 15 is deployed into the passenger compartment. The door closure 12 can be connected at a front edge thereof by a hinge structure 22 including an arm 24 and a pivot 25. Alternatively, the door closure 12 can be tethered so that it will spring free of the instrument panel 10 to form the deployment opening. An example of a hinged door closure is set forth in U.S. Pat. No. 3,708,179 and an example of a tethered door closure is set forth in U.S. Pat. No. 4,968,057. In each case, the door closure 12 has an outer skin or cover portion 26 of thermoplastic material such as polyvinyl chloride or PVC. The outer skin can be made of other thermoplastic materials such as thermoplastic olefins (TPO) or urethane or thermoplastic elastomers (TPE) materials, examples of which include polyolefins and urethanes.

The door closure 12 further includes a core 28 and in some cases a retainer plate or insert 29. In the present invention, the outer skin 26 covers a core 28 of suitable material such as a urethane foam. In the illustrated construction, the skin 26 is wrapped around the edge of the core 28. The wrap can occur during a foam molding process in which the outer skin layer 26 is placed in the foaming mold along with the insert 29. Foam precursors are then directed into the mold where they react to form the core 28 behind the outer skin layer 26. In the case of a preform, the outer skin layer 26 can be formed by vacuum about the insert 29. In either case, the edges of the skin 26 can delaminate from the core 28 as the air bag is deployed through the deployment opening 20 as shown at 30 in FIG. 3.

According to the present invention, such regions of possible delamination are covered by a lip 32 a fastener or hold down tab 34 for holding the door closure 12 in normally closed position within the instrument panel 10. While an instrument panel 10 is illustrated, it will be understood by those skilled in the art that the door closure 12 can be mounted in other vehicle components including the steering column on the driver's side of a vehicle, in control modules or in other interior trim parts that are located so as to enable an air bag deployed therefrom to pass into the passenger compartment in a manner to protect a passenger upon vehicle impact.

Figure 4:
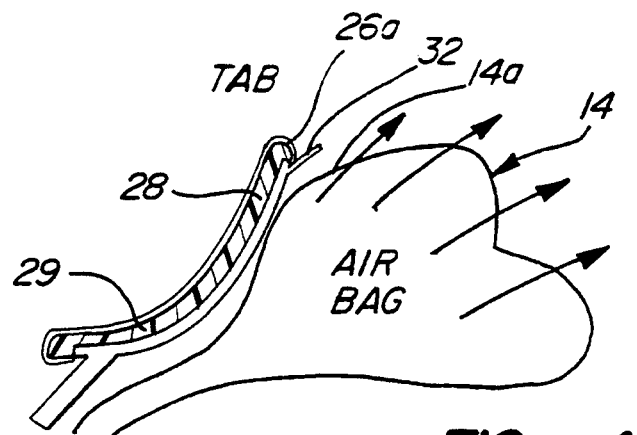
FIG. 4 is a fragmentary diagrammatic view of the present invention showing a fastener plate shielding the closure against delamination when the closure is in the open position shown in FIG. 2.
Figure 5:
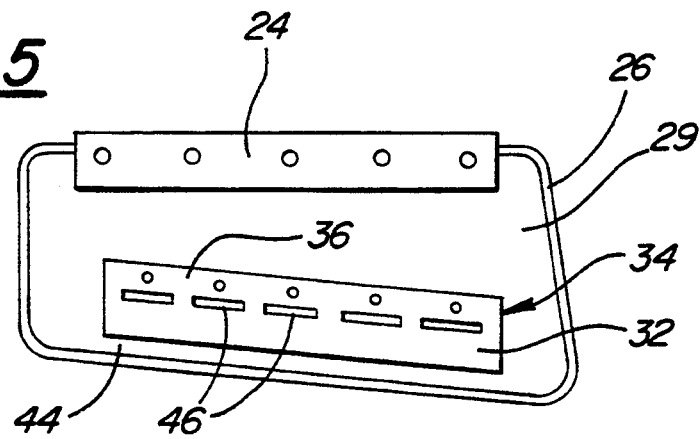
FIG. 5 is a bottom view of the closure and fastener tab of the present invention.
Figure 6:
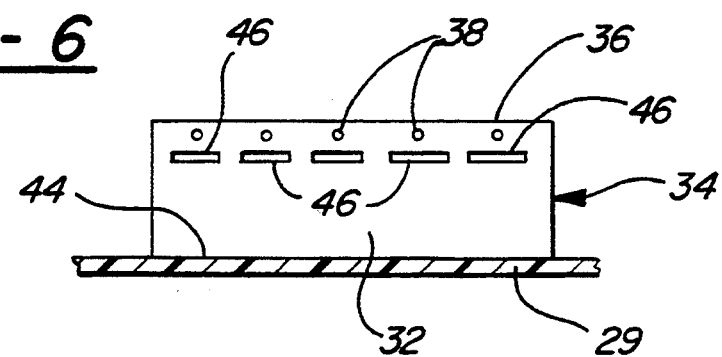
FIG. 6 is a side view of the a fastener plate in FIG. 5 showing the location of tear slots therein to form a shield lip during air bag deployment.

More particularly, as shown in the embodiment of FIGS. 4-6, the tab 34 has an outer or rear edge 36 connected by a plurality of spaced fasteners 38 to a mounting or hold down member 40, for example, a canister 42 for the air bag 15, along the rear edge of the door closure 12.

The tab 34 has an inner or forward edge 44 which can be molded as part of the retainer substrate or otherwise connected to the insert 29 immediately adjacent the edge of the insert 30 where an edge 26a of the outer skin 26 is wrapped and connected to the inner surface of the core 28 at the rear edge thereof. The tab edge 36 has a plurality of spaced slots 46 formed therein that define weakened regions for separating the tab 34 when the air bag 14 is inflated to direct an upward force on the inner surface of the door closure 12.

In accordance with the present invention, the tab 34 has a lip 32 formed between the slots 46 and the inner edge 44. The lip 32 is straight and is configured to have a length that will cover the rear edge of the door closure 12 when the air bag 14 is deployed as shown in FIG. 4. As a consequence, the outer surface 14a of the air bag 14 cannot abrade against the door closure 12 at the edge 26a thereof. The outer skin layer 26 will remain on the core 28 at edge 26a and the core material will not be fragmented during air bag deployment.

Figure 7:
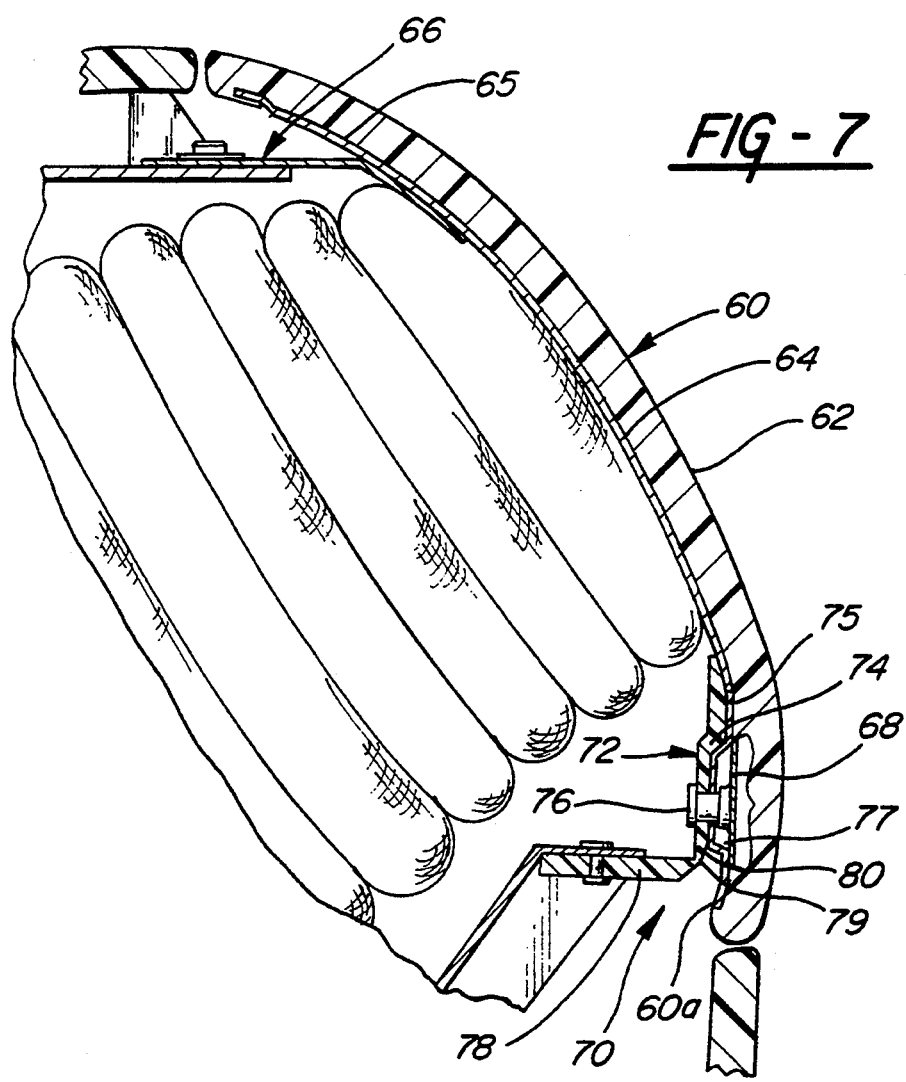
FIG. 7 is a sectional view through a closure including a second embodiment of the present invention.
Figure 8:
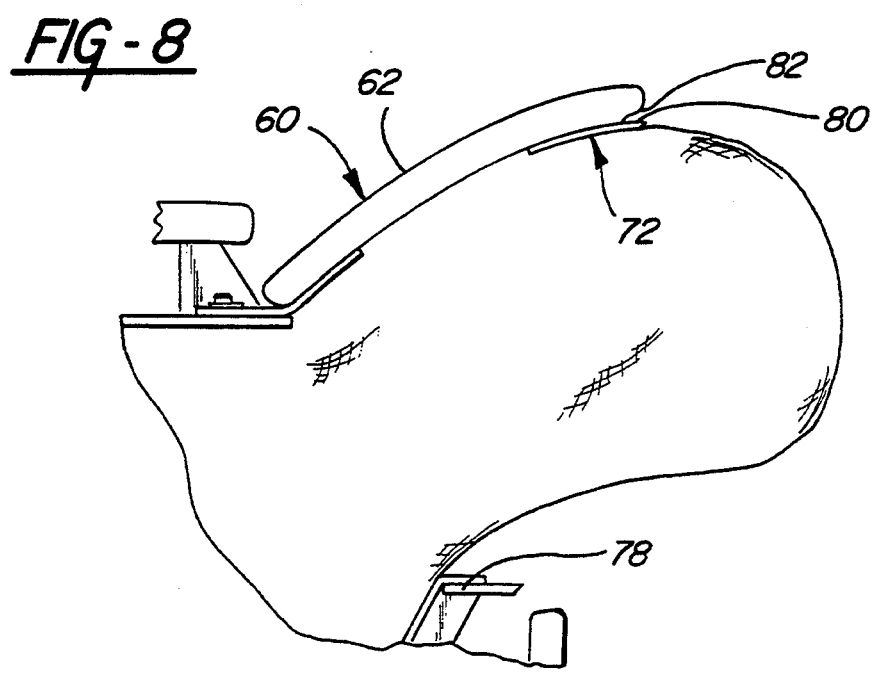
FIG. 8 is a fragmentary diagrammatic view like FIG. 4 showing the embodiment of FIG. 7 shielding the closure against delamination.

In the embodiment of FIGS. 7 and 8, a door closure 60 is illustrated having an outer skin layer 62 covering a core 64. The door closure 60 includes an insert member 64 that has one end 65 connected to a hinge assembly 66. The opposite end 68 of the insert member 64 is connected to a mounting assembly 70. In accordance with the present invention, the mounting assembly 70 includes a mounting flange 72 having one portion 74 thereof connected by fasteners 76 (one shown in FIG. 7) along the rear edge of the door closure 60. The fasteners 76 are fastened to a connection plate 77 within the core 64 at the rear edge. The aluminum insert 64 is provided to prevent the door closure 60 from distorting because of temperature variances at its location within the instrument panel. Such variances can be substantial since the door closure 60 is located below the front windshield of a vehicle and is subject to the full sun load thereon. Additionally, during winter driving conditions the same location can be subject to the outside winter ambient temperature when the vehicle is parked.

One feature of the invention is that the aluminum insert 60 provides a straight line connection between the outer skin layer 62 and the insert 60. The mounting flange or tab 72 includes a second portion 78 that extends generally perpendicularly of the first portion 74 where it is connected by a weakened section 79 therebetween. The second edge portion 78 is adapted to be connected to a suitable mounting member such as the canister housing for an air bag.

Features of this embodiment of the invention is that the mounting flange 72 has a weakened section 79 that can be configured to meet the opening forces required in a given design. The first edge portion 74 covers tooling holes 75 and the pour hole for directing foam precursors between the insert 64 and the outer skin layer 62 such that the air bag will not cause fragmentation of foam at these locations. The combination of a metal insert and a plastic tear seam flange provides thermal stability such that the flange will perform a retention and a controlled separation function through a wide range of temperature conditions.

The mounting flange 72 can be serviced and replaced without scrapping the entire door closure. Further, the mounting flange 72 is connected after the door closure has been foamed. Thus, their is no need to handle an assembled door closure and mounting flange during the plant processing with consequent breakage or cutting of the tear seam or weakened section in the mounting flange 72 due to handling or packing of the assembled parts.

Figure 3:
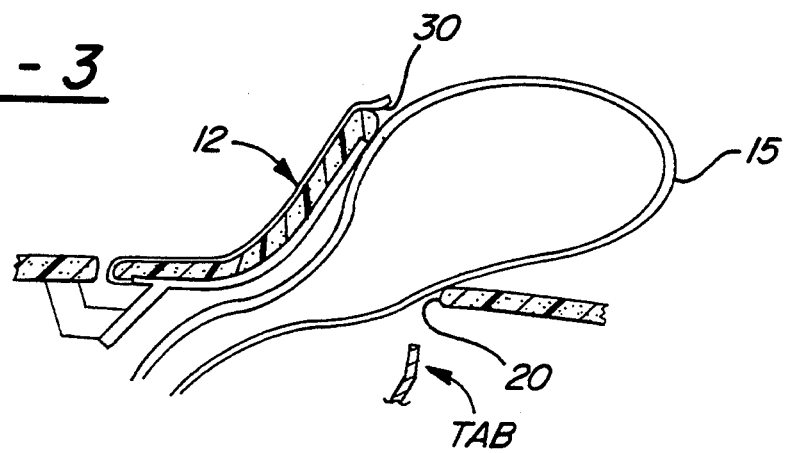
FIG. 3 is a fragmentary diagrammatic view of a prior art closure in an open position during air bag deployment.

A further feature of the embodiment in FIGS. 7 and 8 is that a lip 80 is formed on the mounting tab 72 to protect the edge 60a of the door at the intersection 82 between the core 64 and the skin layer 62 during air bag deployment so as to prevent skin delamination as in the case of the embodiment in FIG. 3.

It will of course be understood that the foregoing description is of preferred exemplary embodiments of the invention and that the invention is not limited to the specific embodiments shown. Various changes and modifications will become apparent to those skilled in the art and all such variations and modifications are intended to come within the spirit and scope of the appended claims.

What is claimed is:

1. A closure for a supplemental inflatable restraint system having an inflatable air bag normally collapsed and inflatable to engage the inner surface of a door provided with a hinged connection at the front edge thereof for allowing pivoting of the door into an open position that forms a deployment opening for the air bag, the door having a rear edge opposite to the hinged connection with an outer cover portion an inner substrate and an interposed foam core that is prone to separation on air bag deployment comprising:

a hold down member located inboard of said door and adjacent the rear edge of said door;

a hold down tab located only at the rear edge of said door and having a front edge thereon adapted to be] fastened to the door at the rear edge of the door and said hold down tab having a rear edge; a fastener connecting said rear edge of said hold down tab to said hold down member;

said hold down tab having a straight lip between said front edge and said rear edge thereof; said straight lip having a weakened section therein located closely adjacent said fastener for holding said hold down tab at said fastener to cause said hold down tab to separate at said fastener along said weakened section in response to inflation of said air bag to direct an upward force on said inner surface of said door.

2. The closure of claim 1 further comprising said door having a connection plate embedded therein and means connecting said front edge of said hold down tab to said connection plate.

* * * * *